Jan. 20, 1925.  
H. B. STORMO  
LIFTING JACK  
Filed Feb. 18, 1924
1,523,669
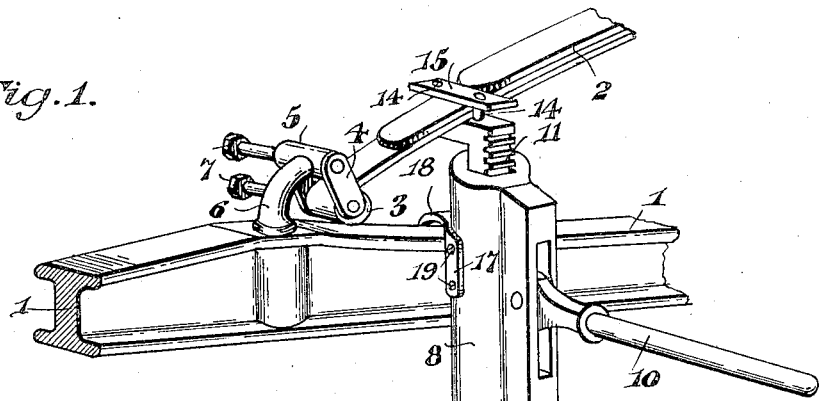
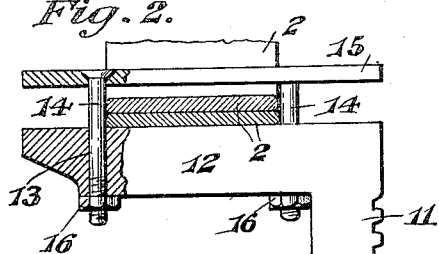
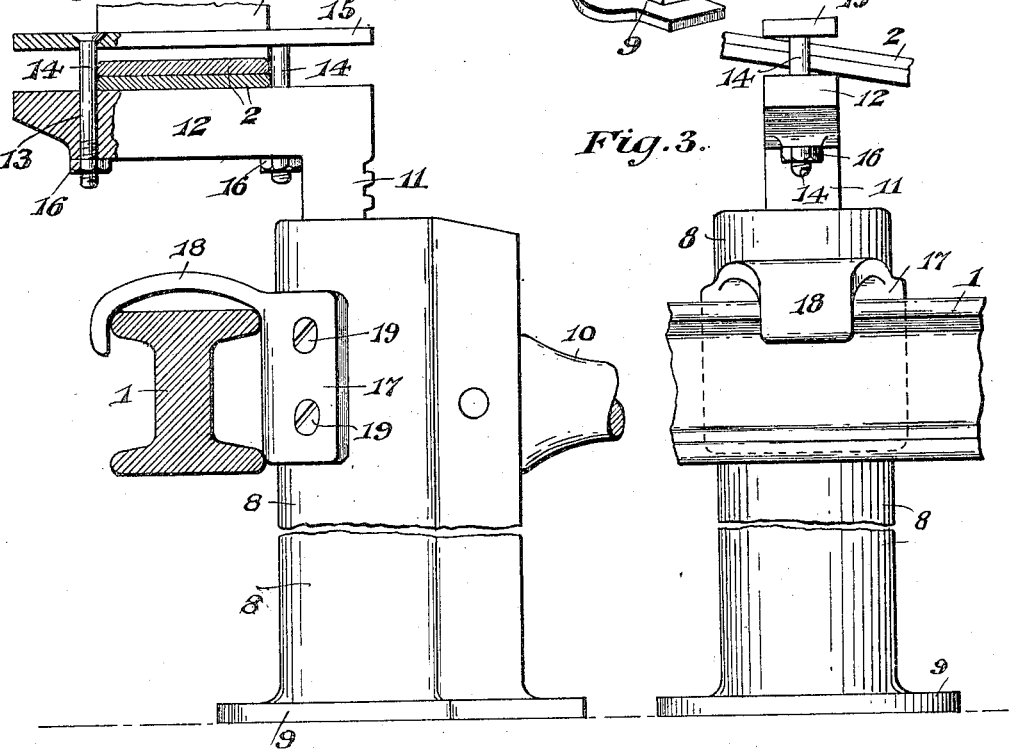
INVENTOR.  
Helmer B. Stormo  
BY  
Geo. P. Kimmel  
ATTORNEY.

Patented Jan. 20, 1925.

1,523,669

UNITED STATES PATENT OFFICE.

HELMER B. STORMO, OF GARRETSON, SOUTH DAKOTA.

LIFTING JACK.

Application filed February 18, 1924. Serial No. 693,589.

*To all whom it may concern:*

Be it known that I, HELMER B. STORMO, a citizen of the United States, residing at Garretson, in the county of Minnehaha and State of South Dakota, have invented certain new and useful Improvements in Lifting Jacks, of which the following is a specification.

This invention relates to lifting jacks and has for its primary object the provision in a manner as hereinafter set forth, of a lifting jack having means for engaging and holding down an automobile axle while at the same time engaging and lifting a spring from the axle.

A further object of the invention is the provision, in a manner as hereinafter set forth, of a jack having a special engaging head, whereby the object engaged by the head of the jack may be secured thereto to prevent the slipping of the object on the head.

A final object of the invention is the provision, in a manner as hereinafter set forth, of a jack having improved engaging features associated therewith which are strong and sturdy, simple in operation, efficient for the purpose for which constructed, and inexpensive to produce.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:

Figure 1 is a perspective view of a device embodying this invention shown as applied to the front axle and spring of an automobile.

Figure 2 is a side elevation of the same showing more in detail the engaging features of the invention, parts thereof being broken away for purposes of clarity.

Figure 3 is a front elevation of the device shown as engaging a portion of a front axle and spring.

Referring now to the drawings in detail wherein like numerals of reference indicate corresponding parts throughout the several views of the drawings, there is shown in Figure 1 a front axle 1 and spring 2 of a well known type of automobile. The lower end of this spring as is well known is rolled as at 3 and connected by links 4 to the head 5 of a perch 6. Bolts 7 are passed through the head 5 and the rolled end of the spring 3 to connect the links 4 in place. This described structure plays no part in the present invention and is shown only to show the manner in which the jack operates to perform its function.

The body of a jack is indicated at 8 having a base 9 and an operating lever 10 pivotally secured in the body of the jack for raising and lowering the toothed standard 11. This standard 11 has a right angularly extending head 12 at its upper end which extends forwardly of the jack and is adapted to support the spring or other body to be raised. This head has a pair of spaced apertures extending vertically therethrough, one of which is indicated at 13, which apertures are adapted to receive depending pins 14 carried by a head plate 15. The apertures are so spaced that there is sufficient room between them for the positioning of the vehicle spring as indicated in Figure 2 and when the spring is positioned over the head 12 between the apertures the head plate pins are passed through the apertures 13 and the head plate depressed to contact with the upper side of the spring whereupon nuts 16 are applied to the lower end of the pins 14 to secure the head plate in position to clamp the spring securely between the head and the head plate.

Secured to the body of the shank 8 beneath the head 12 is an axle engaging member consisting of a semi-circular jack body engaging plate 17 having formed integral with its upper edge and extending forwardly thereof a hook 18 adapted to be positioned over the top of an axle as shown, to hold the same down when the head is being raised to raise the spring, so that the bolts 7 may be easily removed for renewal of parts or for renewal of other parts such as spring shackles or for the insertion of shock absorbers. This plate 17 is secured to the body of the jack in any desired manner, screws being here shown as at 19.

In the drawings the Ford type of axle and spring has been used to show the application of the device and in showing the same applied to this type of axle and spring it is necessary to show the hook 18 positioned beneath the head 12 in view of the fact that the spring runs above and parallel with the axle. When used upon other types of machines where the spring runs transversely of the axle, the plate 17 may be applied to the side of the jack so that it will be at right angles to the head and in this position the actuating lever 10 will be parallel with the axle and the spring and axle of the machine may be readily engaged by the hook and head for lifting the spring from the axle in the same manner as is shown in the illustration.

From the foregoing description it may be seen that a very novel and efficient means is provided for lifting the spring from the axle of a machine at the same time holding down the axle to prevent that from being raised with the spring.

Having thus described my invention, what I claim is:

1. In a lifting jack having a vertically moving standard, means carried upon the body of said jack for engaging and holding an object against upward movement, means to provide a lifting head upon and extending at right angles to the upper end of said standard, said head extending a substantial distance beyond said jack body, and a securing member associated with said lifting head for securing an engaged object to prevent the same from slipping from the head.

2. In a lifting jack having a vertically moving standard, a downturned hook member carried upon the body of said jack for engaging and holding an object against upward movement, a right angularly extending head formed integral with the said standard and projecting a substantial distance beyond said body, and a plate associated with the top of said head, to secure the engaged object thereon.

3. In a lifting jack having a vertically moving standard, for use upon automobiles, a downturned hook member carried upon the side of the jack body for engaging over an axle, a lifting head having spaced apertures extending vertically therethrough, formed upon and at right angles to said standard and extending a substantial distance beyond said body for engaging under a spring, a top plate associated with said head and adapted to be placed over said engaged spring, and depending pins carried by said plate and positioned one on each side of said spring and adapted to extend through and be secured in said aperture to retain said plate in position to prevent movement of the spring upon the said head.

In testimony whereof, I affix my signature hereto.

HELMER B. STORMO.